United States Patent Office 2,876,224
Patented Mar. 3, 1959

2,876,224

BASIC ESTERS OF SUBSTITUTED PYRIMIDINE-4-CARBOXYLIC ACIDS AND THEIR PREPARATION

Gordon A. Grant, Mount Royal, Quebec, Carl von Seemann, Westmount, Quebec, and Stanley O. Winthrop, Montreal, Quebec, Canada, assignors to American Home Products Corporation, New York, N. Y., a corporation of Delaware No Drawing. Application August 7, 1957
Serial No. 676,721

7 Claims. (Cl. 260—256.4)

The present invention relates to new esters of substituted pyrimidine-4-carboxylic acids, and more especially to the dialkylaminoalkyl esters of those acids.

This application is a continuation-in-part of our copending application directed to the same chemical compounds, Serial No. 582,951, filed May 7, 1956 (now abandoned).

While basic esters of numerous heterocyclic acids are known, esters of substituted pyrimidine-4-carboxylic acids have never been prepared. We have now found that basic esters of certain substituted pyrimidine-4-carboxylic acids are useful as starting materials for the manufacture of dyes and as intermediates in the synthesis of novel pyrimidine derivatives.

These compounds, both in the form of the basic esters, and in the form of their non-toxic, water-soluble acid addition or quaternary salts, are also useful therapeutically as spasmolytics of low toxicity with special musculotropic activity.

The halogen atom in the 5-position in our new compounds is highly active, and thus offers many possibilities for preparing various derivatives, such as amino-, alkylamino-, arylamino- and thiouronium compounds. Since the basic esters of substituted pyrimidine-4-carboxylic acids are only sparingly soluble in water, we prefer to use them in the form of their water-soluble acid addition or quaternary salts.

The general structure of the compounds of our invention may be represented by the following formula:

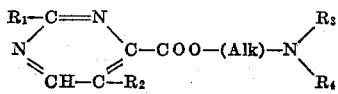

where $R_1$ is selected from the group which consists of lower alkyl and lower alkylmercapto; $R_2$ is selected from the group which consists of chlorine and bromine; Alk represents an alkylene group containing from 2 to 3 carbon atoms; and $R_3$ and $R_4$ each represent the same or different alkyl groups containing from 1 to 3 carbon atoms; and wherein $R_3$ and $R_4$ may also be linked with each other to form a pyrrolidine or piperidine ring, or which may be linked through a further hetero atom such as oxygen to form a morpholine ring. In all cases such heterocyclic groups are attached to the alkylene group Alk through their nitrogen atom.

The tertiary nitrogen atom attached to the alkylene group has been found to convey strongly basic characters to the compounds of our invention. These compounds are therefore capable of forming acid addition salts with a number of inorganic and organic acids, such as hydrochloric, hydrobromic, sulfuric, tartaric, citric, picric and related acids. The compounds of our invention are by virtue of the same nitrogen atom also capable of forming quaternary ammonium salts with a variety of organic esters of hydrochloric, hydrobromic, hydroiodic, nitric, sulfuric and related acids such as methyl chloride, methyl bromide, ethyl bromide, methyl iodide, ethyl iodide, methyl nitrate, dimethyl sulfate and related esters.

Many of the starting materials utilized in forming our new compounds, especially the substituted pyrimidine-4-carboxylic acids, may be prepared by processes which have been described in the literature. For example, the 2-methyl-5-chloro- and 2-methyl-5-bromo-pyrimidine-4-carboxylic acids may be prepared by the method of Budesinsky, Coll. Czech. Chem. Comm. XIV, 223 (1949). The starting material 2-methylthio-5-bromo-pyrimidine-4-carboxylic acid may be prepared by the method of McOmie and White, J. Chem. Soc., 1953, 3129. Essentially known methods may be utilized to prepare others of our starting materials.

In preparing our novel basic esters of such acids we prefer to convert the acids to their respective acid chlorides by means of mild chlorinating agents such as oxalyl chloride or thionyl chloride, preferably by reacting the acids with an excess of the chlorinating agent at the boiling temperature of the mixture, under essentially anhydrous conditions. The excess of the agent is then evaporated under reduced pressure, the residue treated with several portions of a solvent such as benzene or chloroform, evaporating these solvents each time under reduced pressure in order to remove the last traces of unreacted chlorinating agent. The final residue contains the desired acid chloride and is used as such without further purification.

The acid chlorides as obtained above are dissolved in an anhydrous solvent such as benzene or toluene, two equivalents of the basic alcohol are added, and the mixtures are heated preferably at 80–100° C. for several hours under substantially anhydrous conditions. They are filtered after cooling to room temperature from the hydrochloride of the basic alcohol which separates as a by-product, and the filtrates are washed with water until the washings show a pH of 7.2–8.5, indicating that any unreacted basic alcohol had been substantially removed. The washed solutions are then dried and the solvent evaporated under reduced pressure, leaving the desired basic esters as residues.

For the preparation of the acid addition salts, we prefer to dissolve the basic esters as obtained above in an anhydrous solvent such as benzene or ethyl ether, adding a solution containing slightly more than one equivalent of the respective acid in an anhydrous solvent miscible with the first solvent, and isolating the precipitated acid addition salt by filtration. Such acid addition salts may then be purified by crystallization from mixtures of solvents such as benzene-acetone, methanol-ethyl ether, or methanol-acetone-ethyl ether, if necessary with addition of a little decolorizing carbon.

In preparing the quaternary ammonium salts we prefer to react the basic ester, dissolved in an anhydrous solvent such as ethyl ether or acetone, with an excess of the quaternizing agent, in a sealed vessel at a temperature of from 30–60° C., for several days. The desired quaternary ammonium compounds may then be isolated by filtration and purified by crystallization from mixtures of solvents such as methanol-ether, or methanol-acetone-ether.

The following examples are illustrative of our invention:

*Example 1*

2-methylthio-5-chloro-pyrimidine-4-carboxylic acid was prepared by the condensation of mucochloric acid and S-methylisothiouronium sulfate. S-methylisothiouronium sulfate, 30 grams, was dissolved in a solution of 18.3 grams of mucochloric acid in 400 mls. of water. Triethylamine, 33 grams, was then added dropwise for a period of one hour to the stirred solution, which was then allowed to stand overnight. The reaction mixture was then acidified with concentrated hydrochloric acid and the product precipitated. It was filtered off, washed and dried. Yield: 11 grams, M. P.=160–162° C., dec. One recrystallization from aqueous ethanol with charcoal treatment gave 6.0 grams, yellow platelets, M. P.=169–170° C.

Calc. for $C_6H_5N_2ClSO_2$: C, 35.22; H, 2.46; Cl, 17.33; S, 15.67. C, 35.36, 35.83; H, 2.32, 2.71; Cl, 16.87, 17.12; S, 14.60, 14.81.

A sample of 5 grams of the above acid was refluxed for five hours with 12 milliliters thionyl chloride until completely dissolved. The excess thionyl chloride was then evaporated under reduced pressure followed by addition of several 10 milliliter portions of benzene, evaporating each one under reduced pressure until the residue was substantially free from thionyl chloride. The acid chloride obtained in this manner was then dissolved in 50 milliliters dry benzene, two equivalents (5.73 grams) of β-diethylaminoethanol dissolved in 25 milliliters benzene was added, and this mixture was refluxed for five hours. It was filtered after cooling to room temperature, separating the by-product diethylaminoethanol hydrochloride, and the filtrates were washed repeatedly with 50 milliliter portions of water until the water washings showed pH 8.2. The washed solution was then dried with anhydrous sodium sulfate, and the solvent evaporated, yielding the desired basic ester β-diethylaminoethyl 2-methylmercapto-5-chloropyrimidine-4-carboxylate, as residue.

*Example 2*

By following procedure of Example 1, but starting with 4.36 grams β-dimethylaminoethanol, β-dimethylaminoethyl 2-methylmercapto-5-chloro-pyrimidine-4-carboxylate was obtained.

*Example 3*

By following the procedure of Example 1, but starting with 2 grams of the acid and 2.82 grams β-diisopropylaminoethanol, β-diisopropylaminoethyl 2-methylmercapto-5-chloropyrimidine-4-carboxylate was obtained.

*Example 4*

By following the procedure of Example 1, but starting with 2 grams 2-methylmercapto-5-bromo-pyrimidine-4-carboxylic acid and 2.3 grams β-diisopropylaminoethanol, β-diisopropylaminoethyl 2-methylmercapto-5-bromo-pyrimidine-4-carboxylate was obtained.

*Example 5*

By following the procedure of Example 1, but starting with 3 grams of 2-methyl-5-chloro-pyrimidine-4-carboxylic acid and 5.05 grams β-diisopropylaminoethanol, β-diisopropylaminoethyl 2-methyl-5-chloro-pyrimidine-4-carboxylate was obtained.

*Example 6*

By following the procedure of Example 1, but starting with 2.7 grams of 2-methyl-5-bromo-pyrimidine-4-carboxylic acid and 3.61 grams β-diisopropylaminoethanol, β-diisopropylaminoethyl 2-methyl-5-bromopyrimidine-4-carboxylate was obtained.

*Example 7*

Samples of the basic esters as obtained in Examples 1 to 6, inclusive, were dissolved in 10 volumes dry ether and a small excess of hydrogen chloride in solution in dry ether was added. The resulting precipitates were purified by recrystallization, and the following substances were obtained:

From Example 1.—β-Diethylaminoethyl-2-methylmercapto-5-chloro-pyrimidine-4-carboxylate hydrochloride, $C_{12}H_{19}O_2N_3SCl_2$, one sample of which melted at 183° C. with dec.

From Example 2.—β-Dimethylaminoethyl-2-methylmercapto-5-chloro-pyrimidine-4-carboxylate hydrochloride, $C_{10}H_{15}O_2N_3SCl_2$, one sample of which melted at 185–186° C. with dec.

From Example 3.—β-Diisopropylaminoethyl-2-methylmercapto-5-chloro-pyrimidine-4-carboxylate hydrochloride, $C_{14}H_{23}O_2N_3SCl_2$, one sample of which melted at 145–147° C. with dec.

From Example 4.—β-Diisopropylaminoethyl-2-methylmercapto-5-bromo-pyrimidine-4-carboxylate hydrochloride, $C_{14}H_{23}O_2N_3SClBr$, one sample of which melted at 135–136° C.

From Example 5.—β-diisopropylaminoethyl-2-methyl-5-chloro-pyrimidine-4-carboxylate hydrochloride, $C_{14}H_{23}O_2N_3Cl_2$, one sample of which melted at 155° C. with dec.

From Example 6.—β-Diisopropylaminoethyl-2-methyl-5-bromo-pyrimidine-4-carboxylate hydrochloride, $C_{14}H_{23}O_2N_3ClBr$, one sample of which melted at 144–145° C. with dec.

The structures of the above hydrochlorides were confirmed by elementary analysis.

*Example 8*

A sample of the basic ester, as obtained in Example 1, was dissolved in 15 volumes anhydrous ether and heated to 60° C. for four days in a sealed vessel with an excess of methyl bromide. The crystalline precipitate obtained in this manner was purified by recrystallization, yielding β-diethylamino-ethyl-2-methylmercapto-5-chloropyrimidine-4-carboxylate methobromide.

$C_{13}H_{21}O_2N_3SClBr$, one sample of which melted at 159–160° C.

By following the procedure as above, but using methyl iodide instead of methyl bromide, there was obtained β-diethylaminoethyl-2-methylmercapto-5-chloro-pyrimidine-4-carboxylate methiodide, $C_{13}H_{21}O_2N_3SClI$, one sample of which melted at 153° C.

By following the procedure as above, but using the basic ester as obtained in Example 2, and methyl bromide, there was obtained β-dimethylaminoethyl-2-methylmercapto-5-chloro-pyrimidine-4-carboxylate methobromide, $C_{11}H_{17}O_2N_3SClBr$, one sample of which melted at 203–204° C. with dec.

By following the procedure as above, but using the basic ester as obtained in Example 2, and methyl iodide there was obtained β-dimethylaminoethyl-2-methylmercapto-5-chloro-pyrimidine-4-carboxylate methiodide, $C_{11}H_{17}O_2N_3SClI$ one same of which melted at 198° C. with dec.

The structures of the above-described quaternary ammonium salts have been confirmed by analysis.

We claim:

1. A compound selected from the group which consists of basic esters of substituted pyrimidine-4-carboxylic acids of the formula:

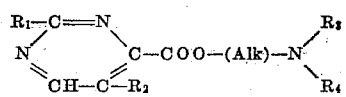

where $R_1$ is selected from the group which consists of lower alkyl and lower alkylmercapto, $R_2$ is selected from the group which consists of chlorine and bromine, Alk represents an alkylene group containing from 2 to 3 carbon atoms, and $R_3$ and $R_4$ each represent the same or different alkyl groups containing from 1 to 3 carbon atoms; acid addition salts of said basic esters with hydrochloric, hydrobromic, sulfuric, tartaric, citric and picric acids; and quaternary ammonium salts of said basic esters with lower alkyl esters of hydrochloric, hydrobromic, hydroiodic, nitric and sulfuric acids.

2. β - Diethylaminoethyl - 2 - methylmercapto - 5-chloro-pyrimidine-4-carboxylate.

3. β - Diisopropylaminoethyl - 2 - methylmercapto - 5-bromo-pyrimidine-4-carboxylate.

4. β - Diisopropylaminoethyl - 2 - methyl - 5 - bromo-pyrimidine-4-carboxylate.

5. β - Dimethylaminoethyl - 2 - methylmercapto - 5-chloro-pyrimidine-4-carboxylate hydrochloride.

6. β - Diethylaminoethyl - 2 - methylmercapto - 5-chloro-pyrimidine-4-carboxylate methobromide.

7. The process of preparing a compound of the formula

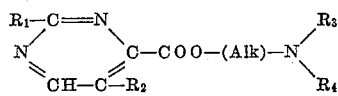

where $R_1$ is selected from the group which consists of lower alkyl and lower alkylmercapto; $R_2$ is selected from the group which consists of bromine and chlorine; Alk represents an alkylene group containing from 2 to 3 carbon atoms; and $R_3$ and $R_4$ each represent the same or different alkyl groups containing from 1 to 3 carbon atoms, which comprises: bringing into contact in a substantially anhydrous solvent at an elevated temperature within the approximate temperature range 80–100° C. and under substantially anhydrous conditions 1 mole of a pyrimidine-4-carboxylic acid chloride of the formula

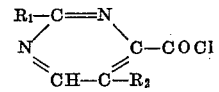

wherein $R_1$ is selected from the group which consists of lower alkyl and lower alkylmercapto, and $R_2$ is selected from the group which consists of chlorine and bromine, and 2 moles of a basically substituted alcohol of the formula

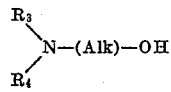

wherein $R_3$ and $R_4$ each represent the same or different alkyl groups containing from 1 to 3 carbon atoms, and Alk represents an alkylene group containing from 2 to 3 carbon atoms.

No references cited.